(12) United States Patent
Hunter et al.

(10) Patent No.: US 11,720,432 B2
(45) Date of Patent: *Aug. 8, 2023

(54) INCIDENT DETECTION AND MANAGEMENT

(71) Applicants: Atlassian Pty Ltd., Sydney (AU); Atlassian Inc., San Francisco, CA (US)

(72) Inventors: Matthew David Hunter, Sydney (AU); Matthew Craig Saxby, Sydney (AU); Michael David Howells, Banksia Beach (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,841

(22) Filed: Feb. 4, 2022

(65) Prior Publication Data

US 2022/0156138 A1    May 19, 2022

Related U.S. Application Data

(63) Continuation of application No. 17/104,890, filed on Nov. 25, 2020, now Pat. No. 11,243,830, which is a continuation of application No. 16/830,061, filed on Mar. 25, 2020, now Pat. No. 10,970,150.

(51) Int. Cl.
*G06F 11/00* (2006.01)
*G06F 11/07* (2006.01)
*G06F 3/0482* (2013.01)

(52) U.S. Cl.
CPC ........ *G06F 11/0769* (2013.01); *G06F 3/0482* (2013.01); *G06F 11/0709* (2013.01); *G06F 11/0751* (2013.01)

(58) Field of Classification Search
CPC ............. G06F 11/0709; G06F 11/0751; G06F 11/0769; G06F 3/0482
See application file for complete search history.

(56) References Cited

U.S. PATENT DOCUMENTS

| | | |
|---|---|---|
| 7,895,470 B2 | 2/2011 | Nastacio et al. |
| 8,504,679 B2 | 8/2013 | Spire et al. |
| 8,521,869 B2 | 8/2013 | Ganesh et al. |
| 8,996,397 B2 | 3/2015 | Grace et al. |

(Continued)

OTHER PUBLICATIONS

Issue trackers—Atlassian Documentation, https://confluence.atlassian.com/bitbucket/issue-trackers-221449750.html, 2020.

*Primary Examiner* — Elmira Mehrmanesh
(74) *Attorney, Agent, or Firm* — Brownstein Hyatt Farber Schreck, LLP

(57) ABSTRACT

Systems and methods for detecting and managing incidents are disclosed. In one embodiment, a method for detecting an incident includes receiving issue data created for an issue tracking system; analyzing the received issue data over a predetermined interval; determining whether a potential incident has occurred based on the analysis; upon determining that a potential incident has occurred, creating an incident management assistant program; identifying one or more relevant users to communicate an alert to; and communicating the alert to the identified relevant users, the alert including a pointer to the incident management program.

20 Claims, 11 Drawing Sheets

(56) References Cited

U.S. PATENT DOCUMENTS

| | | |
|---|---|---|
| 9,141,378 B2 | 9/2015 | Fox et al. |
| 9,229,800 B2 | 1/2016 | Jain et al. |
| 9,329,984 B2 | 5/2016 | Dhangar et al. |
| 9,430,359 B1 | 8/2016 | Troutman et al. |
| 10,249,033 B1 | 4/2019 | Taheri et al. |
| 10,282,686 B2 | 5/2019 | Lassau et al. |
| 10,438,168 B2 | 10/2019 | Varadharajan et al. |
| 10,970,150 B1 | 4/2021 | Hunter et al. |
| 11,243,830 B2 * | 2/2022 | Hunter ............... G06F 11/0751 |
| 2004/0054688 A1 | 3/2004 | Tran |
| 2005/0050210 A1 | 3/2005 | Kennedy |
| 2009/0182794 A1 | 7/2009 | Sekiguchi et al. |
| 2009/0313059 A1 | 12/2009 | Trivedi et al. |
| 2012/0246623 A1 | 9/2012 | Creel et al. |
| 2014/0236649 A1 | 8/2014 | Hamid et al. |
| 2015/0161280 A1 | 6/2015 | Pignataro et al. |
| 2017/0213142 A1 | 7/2017 | Kaluza et al. |
| 2018/0004848 A1 | 1/2018 | Zeng et al. |
| 2019/0132191 A1 | 5/2019 | Mann et al. |

\* cited by examiner

INCIDENT DETECTION AND MANAGEMENT

CROSS-REFERENCE TO RELATED APPLICATION(S)

This application is a continuation patent application of U.S. patent application Ser. No. 17/104,890, filed Nov. 25, 2020 and titled "Incident Detection and Management," now U.S. Pat. No. 11,243,830, which is a continuation patent application of U.S. patent application Ser. No. 16/830,061, filed Mar. 25, 2020 and titled "Incident Detection and Management," now U.S. Pat. No. 10,970,150, which claims the benefit of Australian patent application no. AU2019904889, filed Dec. 23, 2019 and titled "Incident Detection and Management," the disclosures of which are hereby incorporated herein by reference in their entireties.

TECHNICAL FIELD

The present disclosure generally relates to issue tracking systems and in particular to detecting and/or managing incidents in issue tracking systems.

BACKGROUND

Background information described in this specification is background information known to the inventors. Reference to this information as background information is not an acknowledgment or suggestion that this background information is prior art or is common general knowledge to a person of ordinary skill in the art.

In general, the continuous improvement to software or computer code requires consistent and reliable tracking of various technical problems or issues that occur during execution of the software. Technical problems or issues may be tracked using a system that manages progress and completion of the various problems or issues. However, some traditional systems have limited access to user information or the ability to monitor ongoing activity. As a result, some traditional systems may not be able to identify widespread issues or a distributed technical effect of a software problem. The systems and techniques described herein address some of the shortcomings with traditional systems and may be used to provide a more efficient technical solution to a software issue or other technical problem.

Figure 1:
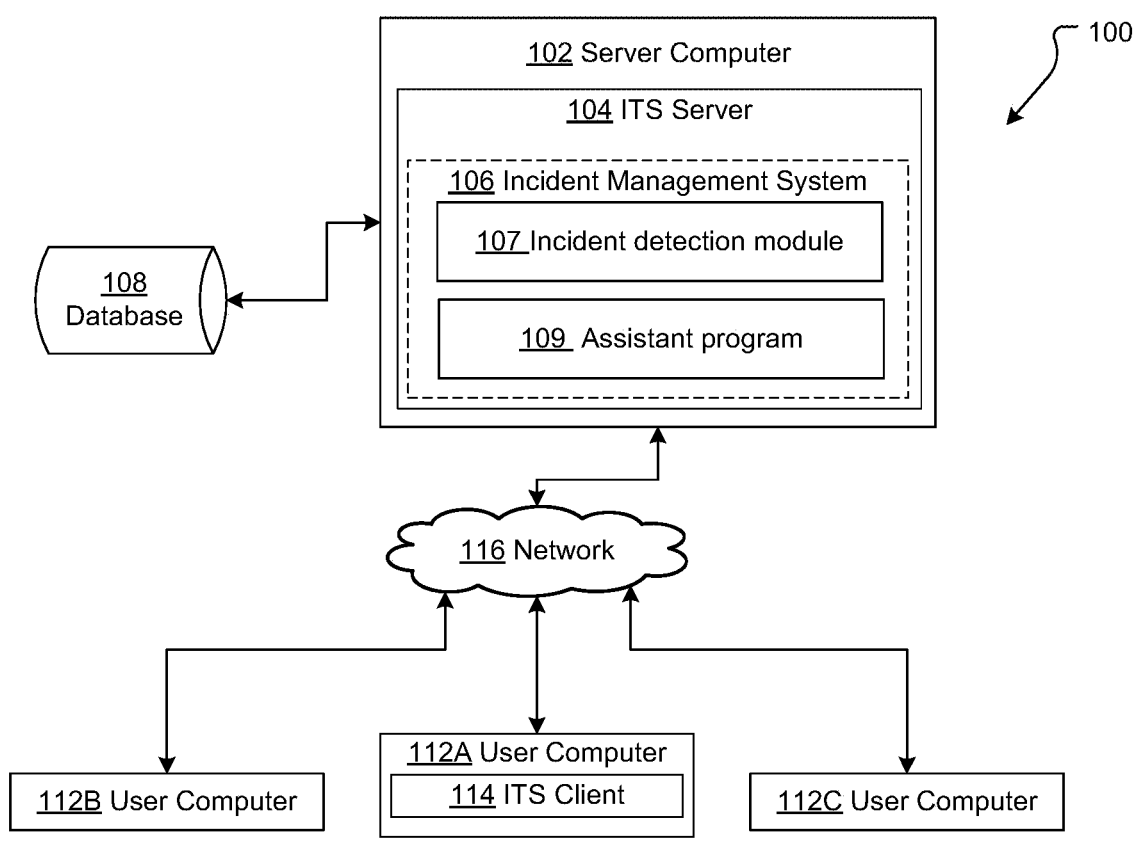
FIG. 1 is a diagram depicting a single-server networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description, numerous specific details are set forth in order to provide a thorough understanding of the claimed invention. It will be apparent, however, that the claimed invention may be practiced without these specific details. In some instances, well-known structures.

In general, issue tracking systems are systems that manage the creation and tracking of issues in a variety of contexts. Issue tracking systems are variously referred to as trouble ticket systems, support ticket systems, request management systems, and incident ticket systems. As one example, an issue tracking system may be deployed for use by a helpdesk providing customer support for one or more software applications or services. Whenever users require assistance on the supported software applications or services, they may raise issues. A busy helpdesk may manage thousands, tens of thousands, or even more such issues.

Issue tracking systems (also referred to herein as "ITS" or "ITS systems") often handle issues that affect individual users—e.g., issues related to insufficient permissions to access a particular service, issues related to upgrade requests, etc. These types of issues are often non-urgent and handled based on an organization's support service charter that sets out permissible time frames for resolving such issues. However, occasionally, ITS systems also handle issues that affect multiple users—e.g., an event that has caused disruption to or a reduction in the quality of service of a software application or service. Such types of issues are often called 'incidents' and incidents can vary widely in severity, ranging from an entire global web service crashing to a small number of users having intermittent errors. Incidents often require an emergency response/solution.

In some cases, users may report incidents in the same manner in which they raise issues. An issue tracking system may be configured to automatically distribute the received issues amongst helpdesk staff as and when issues are received. However, this may make it difficult for the support team to identify and act on incidents quickly. As described herein, an issue tracking system, alone or in conjunction with other systems or modules, be adapted to identify potential incidents and manage issues and user alerts in a manner that may improve the efficiency and/or effectiveness of the technical solution or software fix.

Overview

The embodiments described herein relate to monitoring and managing incidents by an issue tracking system.

As used herein, the term "issue tracking system" (also, "ITS" or "ITS system") generally refers to a system which can be used to track "issues." Typically, when a user faces some kind of issue accessing/working on a software application/service supported by an ITS system, the user may report this issue along with along with a description of the issue using any communication means supported by the ITS—e.g., using a support service user interface hosted on the application/service website, an ITS application client, the phone, email, etc.

At the ITS, this issue information is received and converted into a "ticket." The ticket may include a unique identifier and may also include the information added by the user to describe the issue being faced by the user. In addition to this, the ticket is also associated with a workflow—i.e., a series of states through which the ticket transitions over its lifecycle. The workflow for a given ticket may be simple (e.g. an open state and a closed state) or more complex (e.g. open, closed, resolved, in progress, reopened). The particular information and workflow associated with a ticket may vary greatly depending on the scenario in which the ITS is implemented. By way of example, an ITS may be implemented in a helpdesk scenario, in which case the tickets may be issues logged with the helpdesk. An ITS may be implemented in a project management scenario, in which case the tickets may correspond to project tasks. An ITS may be implemented in a software development scenario, in which case tickets may be associated with bugs, current features under development, and/or features intended for further development. An ITS may be implemented in an organizational administration scenario, in which case tickets may correspond to administrative forms (e.g. leave request forms or the like). Many other ITS implementations in which different types of tickets are tracked through different lifecycles are possible. The embodiments herein will be described in relation to "issues." It will be appreciated, however, that the embodiments and principles thereof may be applied to different types of tickets.

One embodiment may be implemented as part of an ITS, such as JIRA, which is commercially available from Atlassian Pty Ltd., Sydney, Australia.

In a helpdesk implementation, tickets are typically created by customers, e.g., by directly providing issue details via an ITS client application or web browser. In some situations, tickets may also be created by support staff, e.g., in response to a customer raising an issue via other mediums (e.g., over the telephone, in a chat, etc.). In any event, once a ticket is created, it is assigned a unique identifier and stored. This process is repeated for multiple tickets. Stored tickets are assigned to suitable support staff, who may review the description associated with the ticket and work on resolving the underlying issue.

As described previously, when an incident occurs, which affects multiple users, customers may raise issue tickets to request resolution. Nevertheless, because tickets are distributed to support staff based on availability, it may take a long time for the support staff to identify a pattern or realize that there is an increase in the number of tickets related to the same issue and consequently realize an incident has occurred. For example, a support staff may identify a potential incident when he/she receives three or more tickets over a short period of time (e.g., over 10 minutes) from different users that define the same or similar problem. That support staff may then enquire around the office to determine if any other support staff have received similar tickets. If there is a consensus—the support team may determine that an incident has occurred. However, if the helpdesk is manned by 25 support staff and requests are distributed evenly amongst these people, the helpdesk may not realize that an incident has occurred until at least 75 tickets related to the same issue are received. This manual and ineffective manner of identifying incidents wastes crucial time that may be utilized to resolve the incident and/or inform other users about the incident.

Further still, once an incident is detected, it is often difficult for helpdesk staff to know/remember exactly what to do to manage the incident. Some help may be provided in the form of help documents stored in various different locations/folders/databases. However, it is often difficult to remember where to access the documentation. Further yet, because incident management includes numerous steps that involve alerting/notifying various teams and communicating as soon as possible with customers, a helpdesk person may have to access multiple different communication tools and management systems to perform the processes required to manage the incident. All of this increases the cognitive burden on the helpdesk staff and consequently wastes time—which is important when dealing with major incidents.

To overcome one or more of these issues, in some embodiments, an ITS is provided that can automatically detect incidents. To do this, the ITS monitors the rate at which tickets are created. If the rate increases above a threshold value, the ITS may determine that a potential incident has occurred. The threshold value may be static (i.e., remains constant) or dynamic (i.e., varies based on one or more criteria, such as time of day, geographical location, and/or application/service being supported). In addition to this criterion, the ITS may determine that an incident has occurred based on other metadata associated with the tickets—e.g., based on the application/software the issue is regarding, based on the location of the customers that raised the tickets, and/or based on keywords in the description of the ticket. Once the ITS determines that a potential incident has occurred, the ITS generates an alert and communicates this alert to a suitable helpdesk staff (e.g., an available helpdesk manager).

The alert may include a pointer (e.g., a URL link) to an intelligent assistant program as disclosed herein. The assistant program guides the helpdesk staff to manage the incident through a systematic process. Further, the assistant program (which is integrated with a number of communication and management platforms) automatically communicates with the communication tools and management systems on behalf of the support staff) thereby reducing the user's cognitive burden and drastically improving incident management response time, leading to fewer or no errors and faster resolution of incident tickets. The assistant program can aid a helpdesk user to confirm the incident, assess the impact of the incident (and apply a severity level), generate and communicate an incident alert to customers, escalate the incident to the right responders, and label and/or action multiple tickets associated with the incident with one action. By generating and communicating an incident alert informing customers that the support team is aware of the incident in a timely manner, the embodiments disclosed herein can help reduce the number of potential future tickets raised by customers to report the incident—thereby reducing load on the ITS server. Aspects of this assistant program will be described in detail below.

To perform these and other functions, an ITS may be provided using a variety of different architectures. One implementation is a client server architecture where the ITS functionality is provided by a server computer and accessed by users from client computers. Two examples of a client server implementation are described generally below. Alternative implementations/architectures are, however, possible. For example, in the case of small enterprises with relatively simple requirements, an ITS may be a stand-alone implementation (i.e. on a single computer directly accessed/used by the end user).

Single Server ITS Architecture

FIG. 1 illustrates a single server implementation of an ITS 100 in accordance with one embodiment. ITS 100 comprises a server computer 102. Server computer 102 hosts an ITS server 104 for providing server-side functionality of the ITS. The ITS server 104 comprises one or more application programs, libraries, APIs or other software elements that implement the features and functions that are further described herein. For instance, the server 102 allows users to perform various actions with respect to issues—for example, create issues, associate issues with projects and/or other issues, transition issues between workflow states, add/edit information associated with issues, assign issues to specific people/teams, view issues and/or search for issues. The issue tracking system 100 also allows for management of an issue, for example user permissions defining: users that can see an issue and its associated information; users who can edit an issue; users who can transition an issue into/out of a particular workflow state; users who should be automatically notified any time an issue changes (either any change or a particular change), etc.

Further, the ITS server 104 includes an incident management system 106, which configures the ITS server 104 to manage incidents. This system includes two main modules—an incident detection module 107, which is configured to monitor issues and detect incidents and an assistant program 109, which is configured to aid helpdesk staff, manage detected incidents. This system and its modules will be described in detail below.

Server computer 102 also stores or has access to ITS data. ITS data generally includes: ITS metadata defining the operation of the ITS (for example, issue type definitions, issue workflows, user permissions and the like); and issue data (i.e. data in respect of the issues that have been entered into the ITS and are being maintained by the ITS). ITS data may, for example, be stored on a local file system of the server computer 102, a file system of another computer, and/or managed by a database such as database 108. Database 108 will typically be provided by database server operating on a separate physical computer coupled (directly or indirectly via one or more networks) to ITS server computer 102. Database 108 may however be a database server operating on server computer 102 itself.

System 100 also comprises user computers 112A, 112B, and 112C. One or more of the these user computers may be operated by customers to access applications/services supported by the ITS and raise one or more issues. Some of the user computers 112 may be operated by helpdesk staff for handling tickets on the ITS. When the user computer is operated by a helpdesk staff, the user computer 112 may include an ITS client 114 for providing client-side functionality of the ITS 100.

The ITS client 114 may be a general web browser application (such as, for example, Chrome, Safari, Internet Explorer, Opera) which accesses the ITS server 104 via an appropriate uniform resource locator (URL) and communicates with the ITS server 104 via general world-wide-web protocols (e.g. http, https, ftp). The web browser application is configured to request, render, and display electronic documents that conform to a markup language such as Hypertext Markup Language (HTML), Extensible Markup Language (XML) or extensions, and may be capable of internally executing browser-executable code such as JAVASCRIPT, ACTIVE SERVER PAGES, or other forms of code. Where the ITS client 114 is a web browser, the ITS server 104 will be a web server (such as, for example, Apache, Internet Information Server (IIS), Google Web Server (GWS), or nginx). Alternatively, the ITS client 114 may be a specific application programmed to communicate with server 102 using defined application programming interface (API) calls. In this case the ITS server 104 will be a specific application server configured to interact with the ITS client application. A user computer 112 may host more than one ITS client 114 (for example a general web browser client and a specific application client). Similarly, server computer 102 may host more than one ITS server 104.

The ITS server computer 102 may serve multiple user computers 112 (or, more specifically, multiple ITS clients 114). In FIG. 1 three user computers have been depicted (112A, 112B, and 112C), though more or fewer could be used.

The server computer 102 and client computer 112 communicate data between each other either directly or indirectly through one or more communications networks 116. Communications network 116 may comprise a local area network (LAN) of an enterprise in one embodiment. In this case, ITS 100 may be implemented as an on-premises solution in which the server computer 102 and user computer 112 are associated with the same business enterprise and at least the server computer 102 is within an enterprise-controlled facility that is protected from open internetworks using firewalls or other security systems. In another embodiment, network 116 may represent a public internetwork and the server computer 102 may be located off-premises with respect to an organization, such as in a shared data center or cloud computing facility.

Multiple Server ITS Architecture

Figure 2:
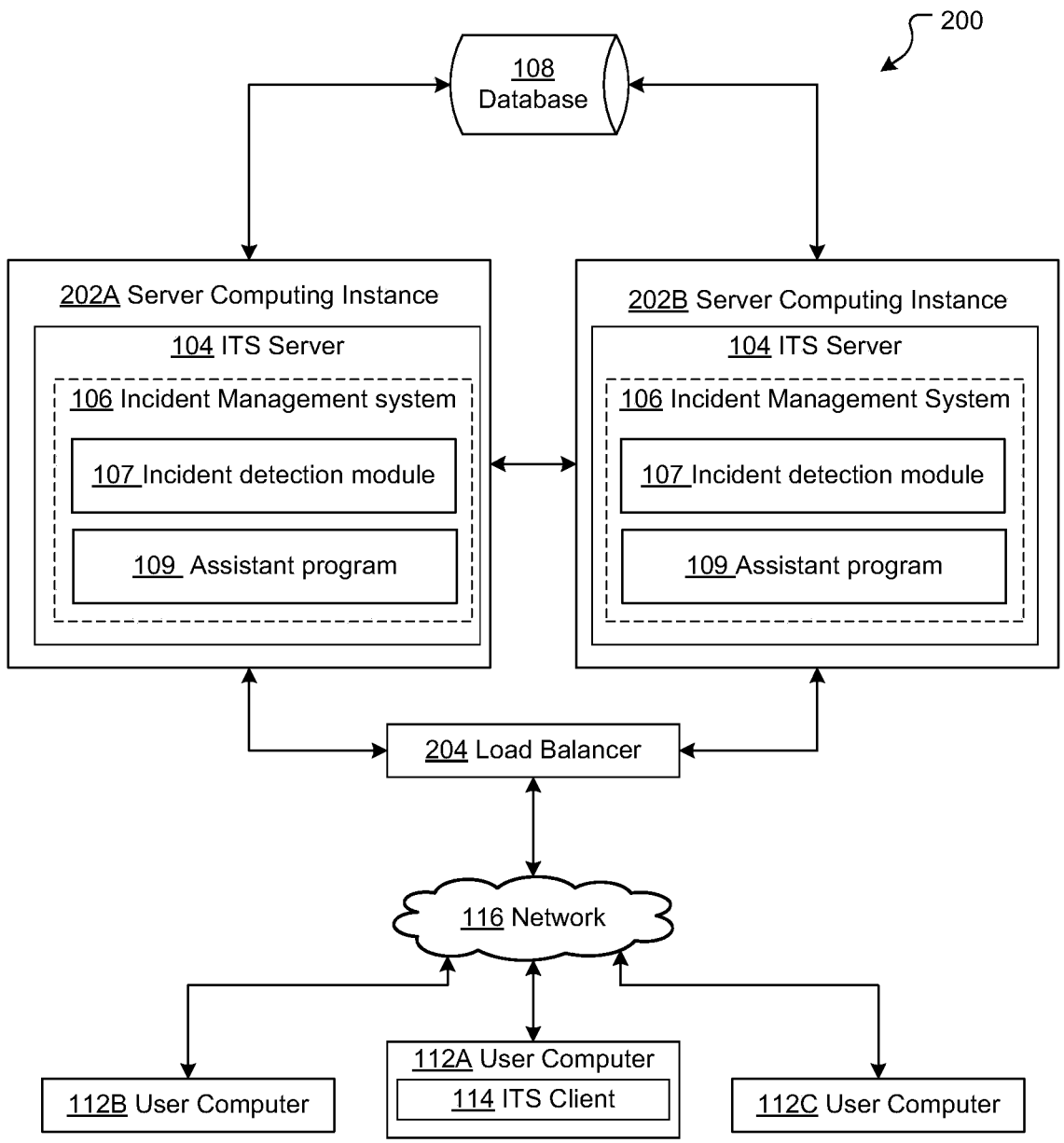
FIG. 2 is a diagram depicting a multi-server networked environment in which various features of the present disclosure may be implemented.

FIG. 2 illustrates a multiple server (clustered) implementation of an ITS 200 in accordance with another embodiment. In the arrangement of FIG. 2, the ITS 200 is implemented using one or more server computing instances 202 (or nodes) that are instantiated on or hosted in a shared data center or cloud-computing infrastructure. Examples include AMAZON WEB SERVICES, RACKSPACE, and private cloud data centers. A server computer instance 202 is instantiated on or hosted in a computer, and in some instances, a single computer may host several server computer instances 202. In FIG. 2, two server computing instances 202A and 202B have been depicted, but there may be any number of server computing instances instantiated from time to time based upon the number of ITS clients 114 that access the instances, or other performance requirements.

An executable image of each server computing instance 202 includes an ITS server 104 with the incident management system 106, in a similar fashion to ITS server 104 described above. Each server computing instance 202 in this embodiment also stores issue data (also described above), which during operation of the ITS is replicated across all server computing instances. In the arrangement of FIG. 2, all server computing instances access a common database 108 to store and retrieve ITS data.

From the client side, the multiple server ITS 100 arrangement of FIG. 2 is essentially the same as the single server arrangement described with respect to FIG. 1. User computers 112 host ITS clients 114 which facilitate access to the ITS server functionality over network 116. In the arrangement of FIG. 2, however, requests from ITS clients 114 are initially received by a load balancer 204, which distributes requests between the available server computing instances 202. Load balancer 204 may be a hardware or software load balancer.

In the arrangement of FIG. 2, network 116 may represent at least one internetwork, such as the public internet, in combination with one or more wired or wireless LANs, WANs, or other network access infrastructure such as cable modems, routers, etc.

In the arrangements described above, the incident management system 106 is shown as being part of and running on the ITS server 102. In some embodiments, the incident management system 106 may not reside on the ITS server 102 but as a stand-alone system that is communicatively coupled to the ITS to receive/forward issue and incident related data from/to the ITS server 102. Further, in some embodiments, the incident management system 106 may be communicatively coupled to one or more other incident management platforms (such as Opsgenie offered by Atlassian, Inc.) to send alerts to helpdesk staff once an incident is detected and/or communication tools (such as Statuspage) to forward application/service status information to the corresponding application/services.

Hardware Overview

The embodiments and features described herein are implemented by one or more special-purpose computing systems or devices. For example, in environment 100 each of the user computer 112, and the ITS server computer 112 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further, alternatively, a special-purpose computing system may include one or more general-purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 3:
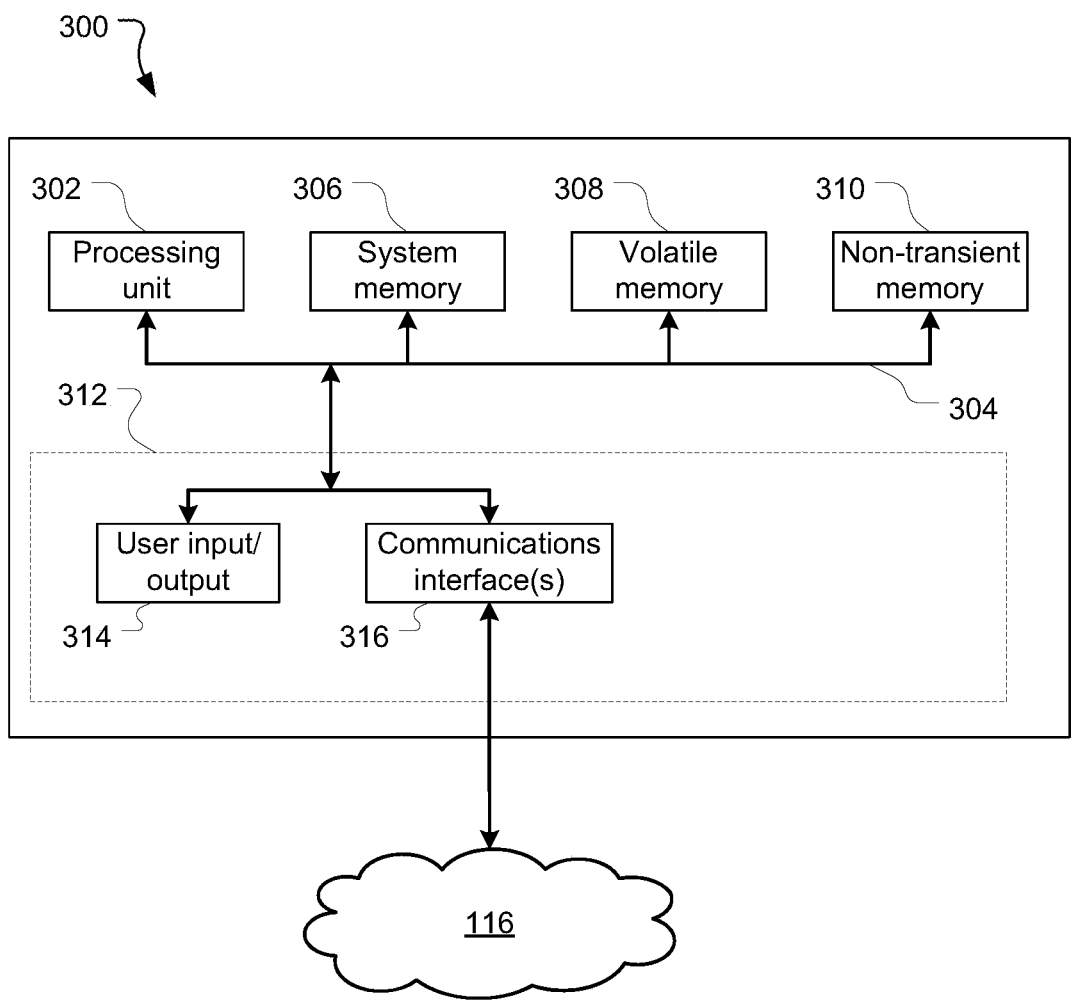
FIG. 3 is a block diagram of a computer processing system configurable to perform various features of the present disclosure.

By way of example, FIG. 3 provides a block diagram that illustrates one example of a computer system 300, which may be configured to implement the embodiments and features described herein. Computer system 300 includes a bus 302 or other communication mechanism for communicating information, and a hardware processor 304 coupled with bus 302 for processing information. Hardware processor 304 may be, for example, a general-purpose microprocessor, a graphical processing unit, or other processing unit.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

In case the computer system 300 is the user computer 112, the computer system 300 may be coupled via bus 302 to a display 312 (such as an LCD, LED, touch screen display or other display), for displaying information to a computer user. An input device 314, including alphanumeric and other keys, may be coupled to the bus 302 for communicating information and command selections to processor 304. Another type of user input device is cursor control 316, such as a mouse, a trackball, or cursor direction keys for communicating direction information and command selections to processor 304 and for controlling cursor movement on display 312.

According to one embodiment, the techniques herein are performed by computer system 300 in response to processor 304 executing one or more sequences of one or more instructions contained in main memory 306. Such instructions may be read into main memory 306 from another storage medium, such as a remote database. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio wave and infrared data communications.

Computer system 300 also includes a communication interface 318 coupled to bus 302. Communication interface 318 provides a two-way data communication coupling to a communication network, for example communication network 116 of environment 100 or 200. For example, communication interface 318 may be an integrated services digital network (ISDN) card, cable modem, satellite modem, etc. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Computer system 300 can send messages and receive data, including program code, through the network(s) 116, network link 320 and communication interface 318.

As noted, computer system 300 may be configured in a plurality of useful arrangements, and while the general architecture of system 200 may be the same regardless of arrangements, there will be differences. For example, where computer system 300 is configured as a server computer (e.g. ITS server 104), it will typically be provided with higher end hardware allowing it to process data, access memory, and perform network communications more rapidly than, for example, a user computer (such as computer 112).

General ITS Operation

This section describes the general manner in which an ITS such as ITS 100 or 200 is deployed and used.

ITS 100 maintains metadata defining the operation of the ITS 100. In one embodiment this metadata includes: one or more issue type definitions, each issue type definition defining a field scheme or field configuration for issues of that type (e.g., the possible fields or data to be maintained by the ITS for issues of a given type); one or more workflow definitions, a workflow definition defining the workflow of an issue of a particular issue type (e.g., the states an issue can take and the manner in which an issue transitions between those states over its lifecycle); and user permissions (e.g., which users may create issues, view issues, amend issues, change the states of issues etc.).

Further, the ITS 100 maintains a list of tickets received by the ITS 100. For each ticket in the list, the ITS 100 may be configured to store a wide variety of information. By way of one simple example, a ticket may include an issue type definition which may define the following fields: an application/service field storing a an application/service associated with the issue; a key field storing a unique identifier for the issue; a description field storing a description of the issue and actions taken with respect to the issue; a status field indicating the stage the issue is currently at in its lifecycle; an assigned person field indicating who (if anyone) the issue has been assigned to; a severity field storing the severity of the issue (e.g. critical, major, minor, etc.); a priority field storing the priority of the issue at a general level (e.g. very high, high, medium, low, very low); and a rank field storing a rank value in respect of the issue (defining a rank order of the issue relative to other issues). In this example, the priority field and the rank field store different information. A large number of issues may have the same priority (e.g. critical), however only one issue may have a given rank value. The actual fields defined with respect to an issue type will depend on the requirements of a given ITS implementation, and many other fields are possible.

Figure 4:
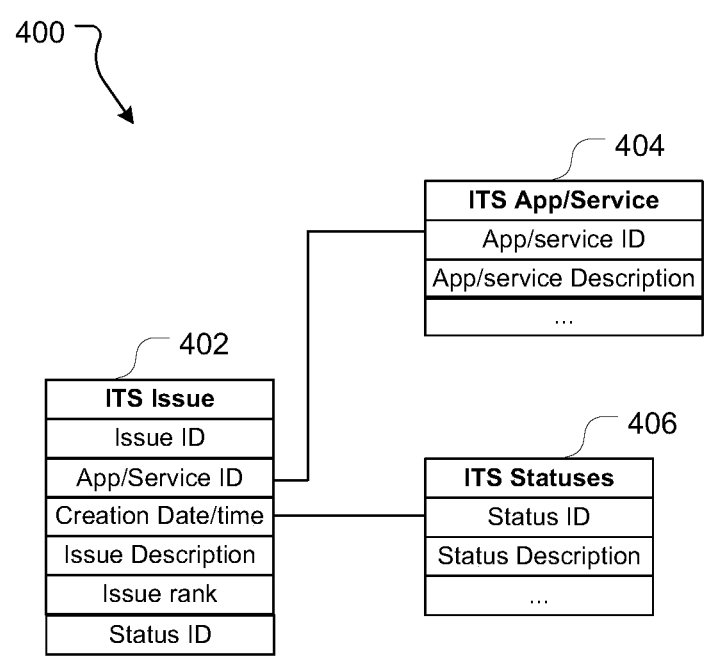
FIG. 4 is a partial example of a simple relational database schema for an ITS.

An ITS may maintain this list of issues in a variety of data structures. In one embodiment, issues are stored in a relational database. By way of illustration, FIG. 4 provides a partial example of a simple relational database schema 400 for an ITS. In this example, schema 400 includes: an issue table 402 comprising an issue ID field, an application/service ID field, a timestamp of when the issue was created, a status ID field, an issue description field, and an issue rank field; an application/service table 404 comprising an application/service ID field, and an application/service description; and a status table 406 comprising a status ID field and a status description field.

Schema 400 has been provided for descriptive purposes, however a relational database schema for an ITS 100 is typically considerably more complex and can have additional/different tables with additional/alternative fields and linked in alternative ways. Furthermore, different data structures entirely could, in some cases, be used. For example, issues could be stored in a single table data structure (which may be appropriate for relatively simple ITSs) where the single table stores all relevant issue data. The table below provides an example of a simple single table data structure for storing issues:

| | | Example issue data structure | | | | |
|---|---|---|---|---|---|---|
| Key | App/ Service ID | Description | Status | Priority | Date/time | . . . . . . |

Monitoring Process

Figure 5:
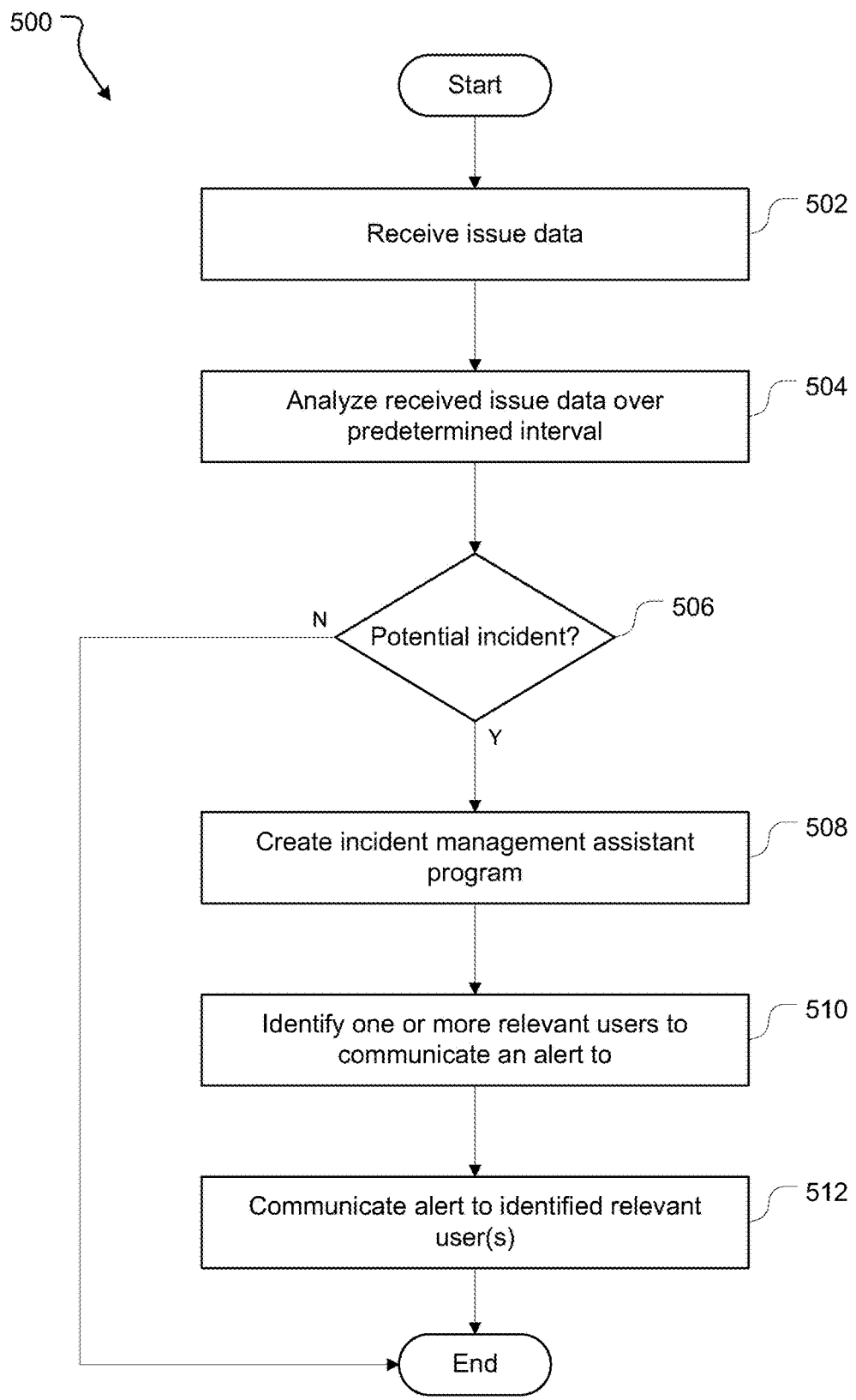
FIG. 5 is a flowchart illustrating an example method for detecting potential incidents according to some aspects of the present disclosure.

This section describes a computer-implemented method for detecting an incident. The process 500 will be described with reference to the flowchart of FIG. 5, which illustrates processing performed by a computer processing system. In certain embodiments, these processing steps are performed by the incident management system 106 running on a computer processing system (e.g. the ITS server 104 as described above). In alternative embodiments the processing described may be performed by one or more alternative systems (operating in conjunction with the ITS server or independently) and/or alternative applications/modules running on those systems.

The method begins at step 502 where the incident management system 106 receives issue data. In certain embodiments, the incident management system 106 polls the ITS server 104 at regular intervals (e.g., every minute) to receive the issue data (e.g., a list of ITS issues that have been created in that interval). In other embodiments, the ITS server 102 pushes issue data related to ITS tickets to the incident management system 106 continuously (as and when new tickets are created) or periodically (e.g., every minute, every few minutes, etc.).

In other embodiments, issue data may not be directly received from the ITS server 102, but from another intermediary system. In some examples, a central intermediary system may subscribe to updates from the ITS server 102. This intermediary system may then store the retrieved data (which includes issue data) in its own controlled database. Third party systems and micro services such as the incident management system 106 can subscribe to or query this central intermediary system to receive updates. Alternatively, the incident management system 106 can poll this intermediary system (periodically) to retrieve the required data as and when required.

The issue data, polled for or automatically received either directly from the ITS server 102 or the intermediary system, may be communicated as one or more issue descriptors to the incident management system 106, where each issue descriptor corresponds to a ticket. Further, each issue descriptor may include information about that particular ticket including, e.g., a unique identifier for the ticket, an application/service identifier, a description, status, a creation date/time, etc.

An example issue descriptor is illustrated in Table A below. Although a table has been used to illustrate information received in the issue descriptor, the relevant information need not be received in a table and could be received in any appropriate format (e.g. a simple text file, a JavaScript Object Notation (JSON) file, an XML file).

TABLE A

Example issue descriptor

| | |
|---|---|
| Issue ID | 347kdsfjh38764 |
| Application Identifier | Bitbucket Cloud |
| Description | . . . |
| Status | Open |
| Creation date/time | May 12, 2019 9:12:03:01 |

The incident management system 106 may store the received issue descriptors in its own database or cache for further analysis.

At steps 504 and 506, the incident detection module 107 analyses the received issue data over a predetermined interval to determine whether an incident has occurred. As described previously, the incident detection module 107 may be configured to make this determination based on one or more factors. For instance, the determination can be made based on a rate of issue creation within a particular time window exceeding a threshold value. Further, this threshold value may be dynamic—i.e., it may change over the course of a day—increasing for particularly busy periods of the day (e.g., between 9 am to 5 pm) and decreasing for known lull periods (e.g., between 9 pm and 3 am). Alternatively, or in addition, the threshold value may vary for different services/applications—it may be higher for applications that have historically received more issues and lower for applications that have historically received fewer issues. Similarly, the threshold value may vary for different geographical areas—higher values in geographical areas that have higher number of customers and lower values in geographical areas that have fewer numbers of customers.

This determination can further be fine-tuned. For example, the incident detection module 107 can analyze the issue description (from the issue descriptors) for keywords and determine that an incident has occurred if the same or similar keywords are identified in a threshold number of issue descriptors related to the same application/service in a given interval. It will be appreciated that any combination of these criteria may be employed to make this determination. The remainder of this method will be described with reference to the example of determining whether an incident has occurred based on the rate of issue creation exceeding a dynamic threshold. However, it will be appreciated that the method equally applies to any of the other criteria on which this determination can be made.

At step 504, as a part of analyzing the received issue data over the predetermined interval, the incident detection module 107 calculates a rate of issue creation in that predetermined interval. To this end, the incident detection module 107 retrieves the issue descriptors for all the issues that were created in the predetermined interval (e.g., last 20 minutes). The relevant issue descriptors can be identified by performing a lookup in the creation date/time field of the received issue descriptors. In other embodiments (which are not described here in detail), the incident detection module 107 may retrieve issue descriptors corresponding to a particular application/service that were created in a predetermined interval. In such embodiments, the relevant issue descriptors are identified by performing a lookup in the service/application identifier field and the creation date/time field in the issue descriptors. The rate may be calculated based on the number of fetched issue descriptors in that time interval. For example, if the incident detection module 107 identifies issue descriptors that were created in the last 20 minutes, the rate can be calculated as being 20 issues/20 minutes or 1 issue/minute.

At step 506, as part of determining whether a potential incident has occurred, the incident detection module 107 determines whether the calculated rate of issue creation exceeds the current threshold rate. As described above, the threshold rate can be variable—based on the time of day, the geographical location, and/or the service/application associated with the issues. In one embodiment, the variable rates are predefined. For example, the incident detection module 107 may set a threshold rate of 25 issues/20 minutes in peak periods and a rate of five issues/20 minutes in off peak periods. Accordingly, at this step, the incident detection module 107 may identify the threshold rate to be applied based on the current time of day, the application/service, or the current geographical location and compare the issue creation rate calculated at step 506 with the identified threshold rate.

If at this step it is determined that the calculated issue creation rate is lower than the threshold rate (i.e., the no path from step 506), the method 500 ends. Alternatively, if it is determined at this step that the calculated issue rate is equal to or higher than the threshold rate, the method proceeds to step 508, where the incident detection module 107 determines that a potential incident has occurred and invokes the assistant program 109. The assistant program will be described in detail in the following section.

At step 510, the incident detection module 107 identifies one or more relevant users to communicate an alert to about the potential incident identified at step 508. In some embodiments, the incident management system 106 may be communicatively coupled to a database/system that stores and manages a list of helpdesk staff and a real time schedule of the support staff on duty at any given time. The incident detection module 107 may query this database/system to retrieve name/contact information for one or more helpdesk staff that may be currently on duty. In other embodiments, the incident management system 106 may maintain a pre-configured static list of relevant support staff to contact in case an incident is uncovered. This static list may be configured such that a list of relevant support staff are provided for each of the application/services the ITS is responsible for and for different geographical locations in which the ITS operates. In this case, the relevant support staff may be selected based on the application/service ID associated with a majority of the created issues and/or a geographical location where a majority of the issues were created.

In any case, once one or more relevant users are identified, the incident detection module 107 sends an alert to the identified relevant person(s) at step 512. The alert may be sent using a suitable communication mechanism such as an SMS, an email, a push notification, etc. Further, the alert may include a link to the assistant program.

When the user selects the link, the user is directed to an assistant program, which the user can utilize to manage the potential incident as described in the following section.

In some embodiments, a dedicated incident management platform, such as Opsgenie, offered by Atlassian Pty Ltd., may be available. Opsgenie is a modern incident management platform that ensures critical incidents are never missed, and actions are taken by the right people in the shortest possible time. In case such an incident management platform is available and communicatively coupled to the incident management system 106, once the incident detection module 107 determines that a potential incident has occurred, it may communicate the alert to the incident management platform. As part of the alert, the incident detection module 107, may communicate data including, the time at which the incident was detected, the threshold criteria that triggered the alert, an identifier for the alert, identifier for a potential product/service affected, etc. The incident management platform in turn may categorize the alert based on importance and timing which can be determined based on the data received as part of the alert. The incident management platform maintains its own database of on-call schedules of support staff and identifies the relevant people to communicate the alert to. In certain embodiments, the incident management platform may also identify the responsible team for the alert based on the product/application identifier received as part of the alert data from the incident detection module 107. Accordingly, in this embodiment, steps 510 and 512 are performed by the incident management platform and not by the incident management system 106.

Figure 11:
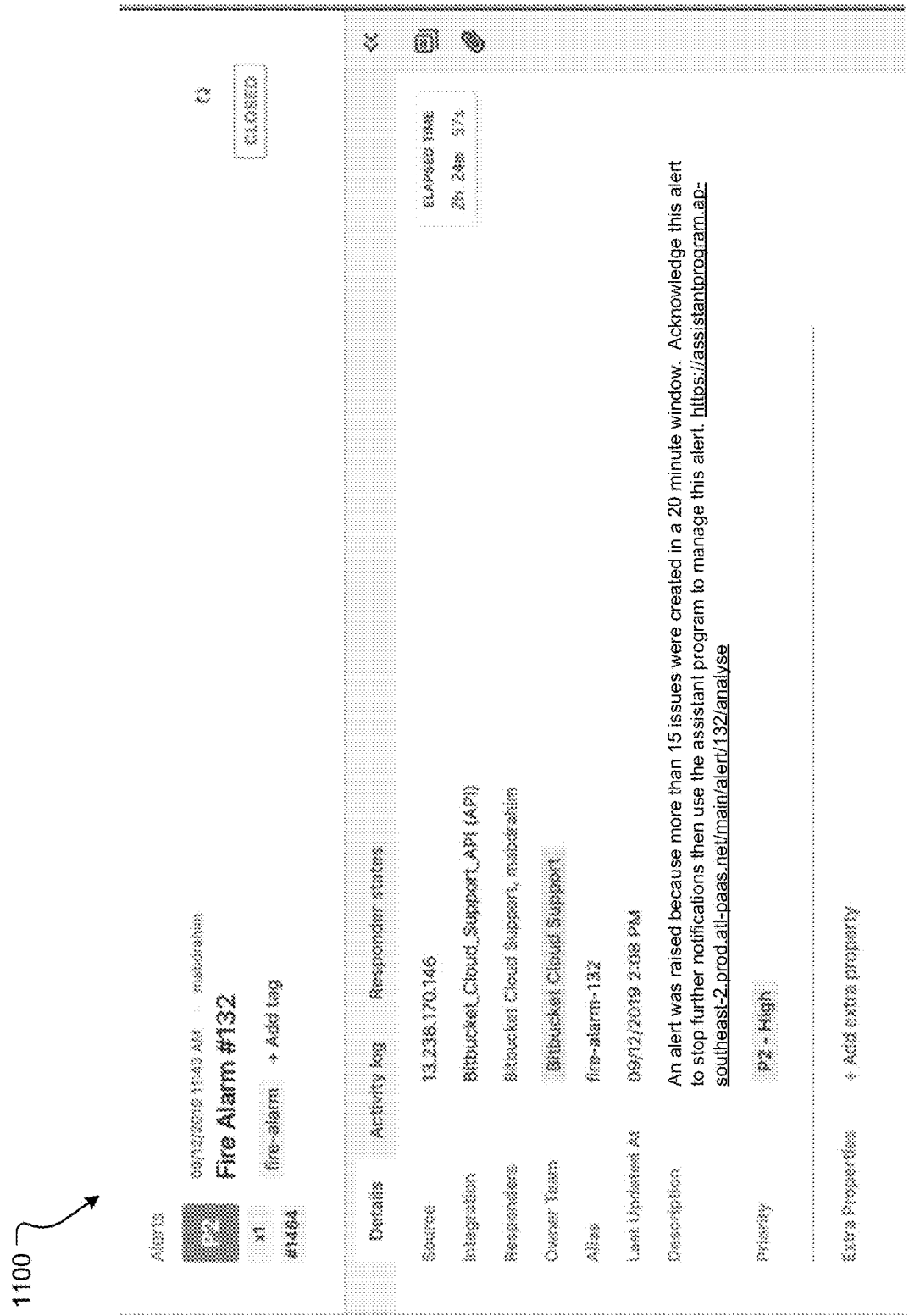
FIG. 11 is a screenshot illustrating an example alert according to some aspects of the present disclosure.

FIG. 11 shows an example alert 1100 communicated by the incident detection platform to one or more identified users. As seen in this example, the alert 1100 includes an alert identifier, a status of the alert, an application/service identifier, a team identifier (of the team responsible for handling such alerts), a time at which the alert was created, a description of the alert, and a priority of the alert. The alert 1100 also include a counter indicating the amount of time elapsed since the alert was generated. It will be appreciated that in cases where the alert is communicated to relevant users directly by the incident management system 106, the alert may appear similar to the alert 1100.

Further, for ease of description, method 500 is described as a single cycle where the method 500 ends when the calculated incident rate is not higher than the threshold rate. However, this is not the case. Instead, method 500 is a continuous method that repeats after fixed intervals. For example, at step 506 if the incident detection module 107 determines that the calculated rate is not higher than the threshold rate, the incident detection module 107 may wait for a predetermined period (e.g., 1 minute) and then repeat method 500. In this manner, in the event that an incident is not detected, method 500 is continuously performed until an incident is detected. Once an incident is detected, method 500 may stop until that incident is managed. The advantage of stopping the incident detection process until the incident is managed is so that multiple incident alerts are not generated for the same incident in a quick succession. In other embodiments, the incident detection process may not stop once an incident is detected. The advantage of this continuous monitoring is that if another non-related incident occurs which causes the rate of issue creation to increase above the threshold while the first incident is being resolved, the non-related incident is not missed. In some embodiments, a middle position may be adopted. The incident detection process 500 may be paused for a predetermined period—e.g., an hour. This period may be set based on historical data about issue creation rates when an incident occurs and timing of issue creation rate reducing back to normal after an incident. For example, if it is known that issue creation returns to a pre-incident rate typically 45 minutes after customers are alerted about the incident, then the incident detection process may be paused for 45-60 minutes after the first incident is detected and resumed after that.

Further still, in some embodiments, the incident detection module may be configured to send an active signal to an external program or system (e.g., the ITS server) at regular intervals (e.g., every second, every 10 seconds, every 30 seconds, etc.) so that the ITS 100 knows that the incident detection module 107 is awake and executing. If one or more active signals are not received by the external system, it may be determined that the incident detection module 107 is not functioning/has crashed and certain measures can be taken to revive the module and/or inform the helpdesk staff that the automatic incident detection system has failed.

Incident Management Process

As described above, when a potential incident is detected, the assistant program 109 is invoked. This program essentially provides a number of sequential user interfaces to a helpdesk support staff determine whether the potential incident is a real or actual incident or not and to provide further instructions to the incident management support assistant to automatically perform one or more functions in response to determining that the incident is a real or actual incident. In some embodiments, the program may provide this information to the user in an incremental fashion so as to guide the user in a systematic fashion to perform the required tasks. In this manner, users that are not very experienced in handling incidents can confidently perform the operations required to minimize the effects of the incidents.

Figure 6:
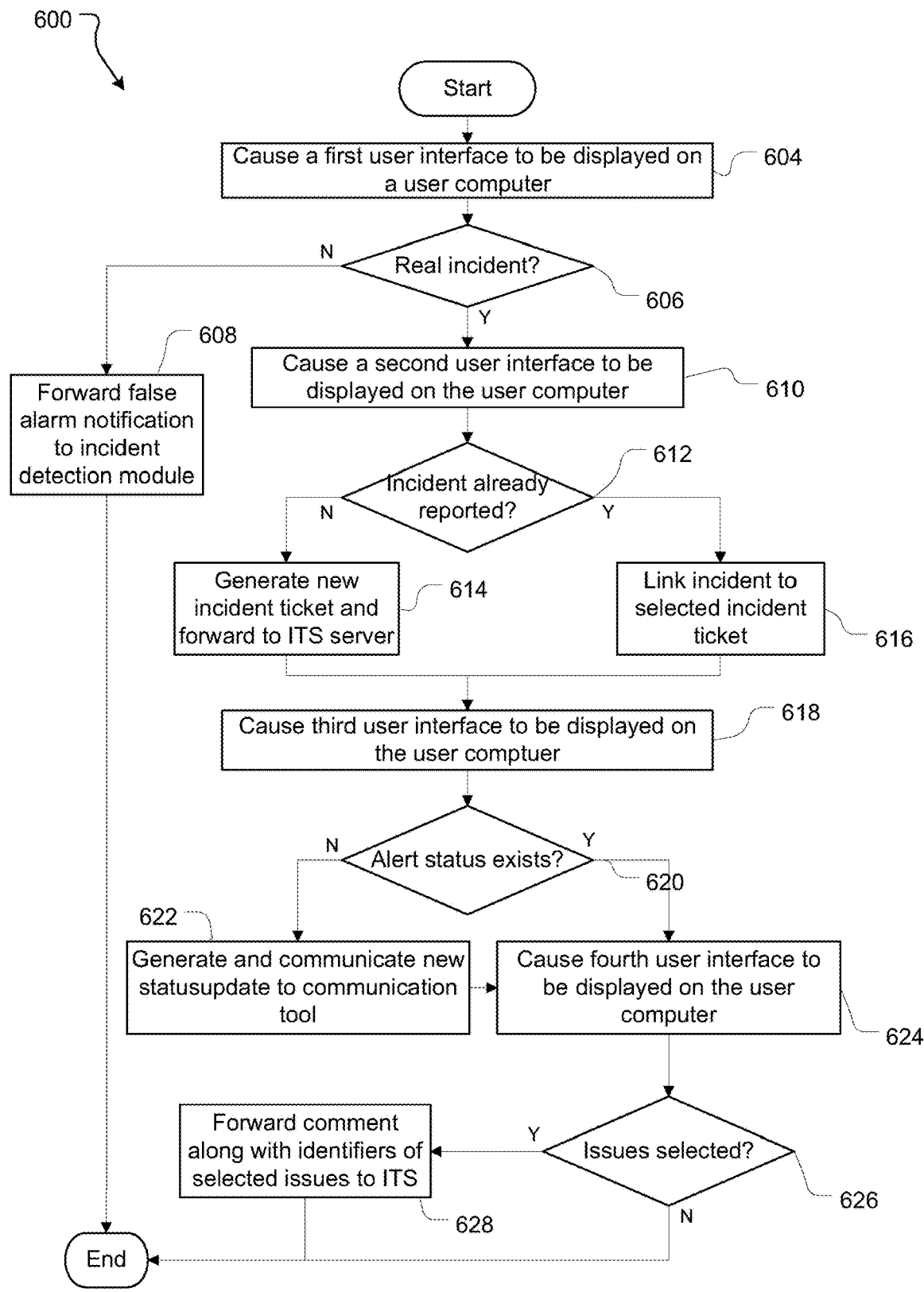
FIG. 6 is a flowchart illustrating an example method for managing a potential incident according to aspects of the present disclosure.

This section describes a process for managing an incident using an assistant program once a potential incident alert is generated and forwarded to the relevant person. The process 600 will be described with reference to the flowchart of FIG. 6, which illustrates processing performed by the assistant program 109. In certain embodiments, these processing steps are performed in junction with a client (either dedicate or in a web browser) running on a user computer 112. In alternative embodiments the processing described may be performed by one or more alternative systems (operating in conjunction with the ITS server or independently) and/or alternative applications/modules running on those systems.

The method commences when the assistant program 109 is invoked. This may be performed, e.g., when the incident detection module 107 detects a potential incident may have occurred (yes path from step 506). The invoked assistant program may create a link to a user interface and forward this link to the incident detection module 107, which forwards the link along with the alert to a relevant helpdesk staff.

Once the staff member selects the link, the assistant program may forward a user interface to the client to be rendered and displayed on a display of the user computer 112 at step 604. In response, the client (either a dedicated client or a web browser) renders the user interface on a screen of the user device.

The user interface can include some static data—e.g., the name and identifier of the alert, and one or more incident management pointers, and some dynamic data, e.g., data corresponding to the issues that resulted in the potential incident being identified and any other issues that were created after the incident was detected. The static data may be created and stored when the assistant program is first invoked and this data may remain the same for different alerts. On the other hand, the assistant program may retrieve the dynamic data when the support staff selects the link and the user interface is rendered on the screen of the user computer 112.

Figure 7:
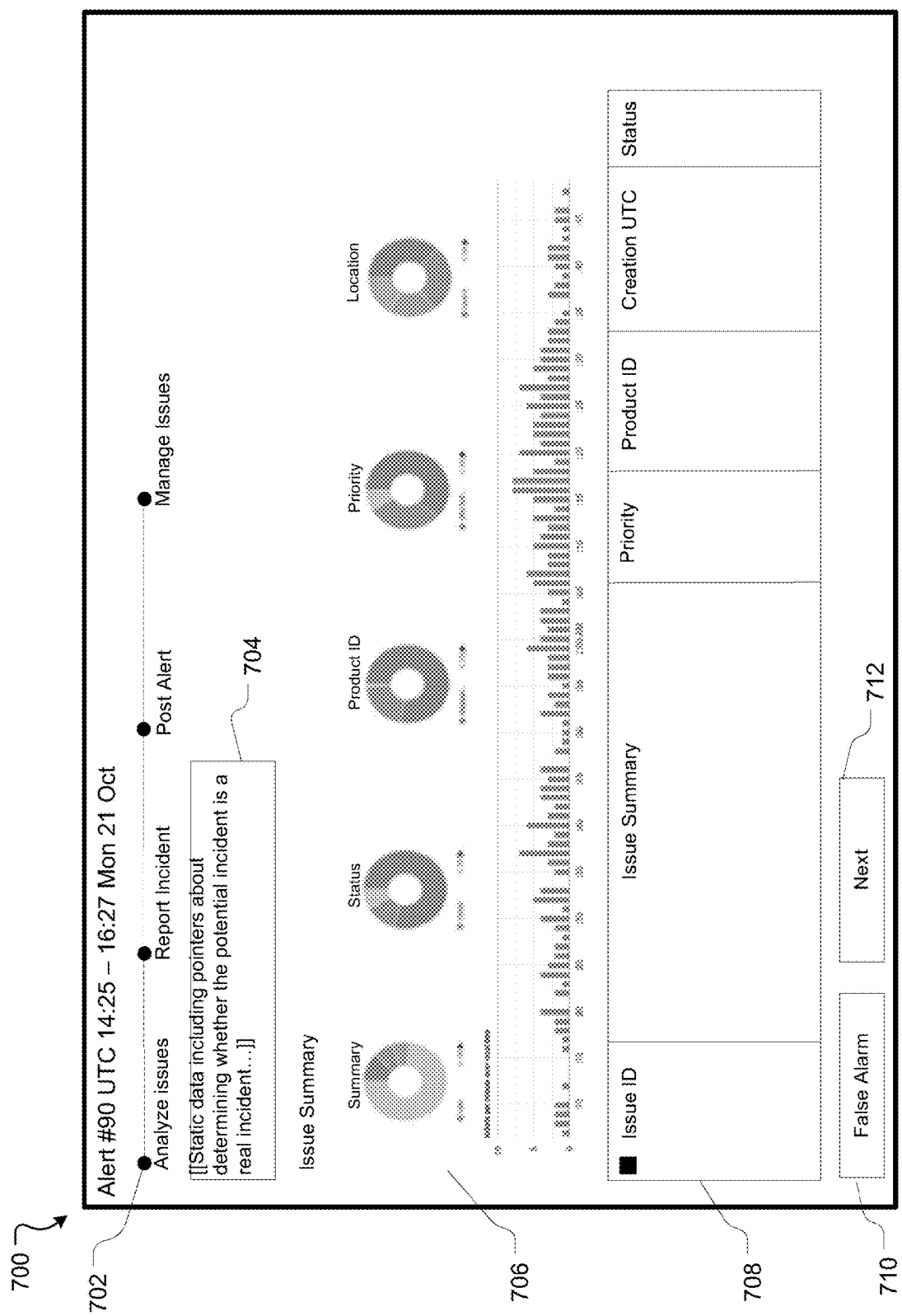
FIG. 7 is a screenshot illustrating a first example user interface of an assistant program according to some aspects of the present disclosure.

FIG. 7 illustrates an example user interface 700 that may be displayed on the user device in response to step 604. The user interface includes a graphical representation 702 showing an order of sequential steps to be executed by the assistant program with the current step highlighted, where each step corresponds to a different user interface to be displayed to the user. In this example user interface, the graphical representation 702 shows four steps, 'analyze support requests', 'report HOT incident', 'post Statuspage alert', and 'manage support requests' with the 'analyze support requests' affordance being highlighted. In addition, the user interface 700 includes static information about one or more functions the user can perform while the user is on the current user interface of the dashboard. In the illustrated example, this information is depicted in box 704. However, it will be appreciated that this information may be depicted in any other manner—such as a checklist of instructions and in some instances it may be entirely omitted—e.g., in case the user interface is rendered for a user that is well-versed with incident management procedures or has used the assistant program a threshold number of time in a particular time period. To enable this, the incident management system 106 may maintain a counter of the number of times users (identified by their unique user identifiers) have accessed the assistant program. This counter may be accessed before the user interface data is forwarded to the client device for display. If the counter indicates that the user has utilized the assistant program a threshold number of times (e.g., 20), the static information shown (e.g., in box 704) may be removed.

The dashboard 700 also depicts a summary section 706 displaying properties of the issues that resulted in the potential incident being detected. In some embodiments, this summary may also include any other issues that were created in the interval between when the potential alert was detected and when this user interface is rendered on the user device. In such embodiments, the summary of properties may be dynamically determined and forwarded to the client when the user interface 700 is rendered.

In the illustrated example, the summary of properties 706 is displayed in the form of pie charts—where each pie chart corresponds to a different property of the issues (e.g., status of the issues, corresponding application/service, corresponding application/service version, priority, etc.). However, it will be appreciated that in other embodiments, the summary of properties may be displayed in the form of any other type of charts/graphs or tables. In essence, the summary of properties section provides a high-level summary of the underlying issues in a manner that allows a user to determine whether the potential incident is a real or actual incident or not at a glance.

In the case of a real or actual incident, one or more properties of the issues should be the same or similar—e.g., the application/service associated with the issues should be the same, or the priority of the issues should be similar. If the summary section depicts that a significant number or proportion of the issues have the same or similar property values (e.g., because the pie charts are divided into very few sections), the user can quickly form an initial opinion that the potential incident may be a real or actual incident. Alternatively, if the summary section depicts that the issues have very different property values, e.g., because the pie charts are divided into multiple different sections, the user can quickly determine that the potential incident is not a real or actual incident.

To further aid the user in making a determination whether the potential incident is a real or actual incident, the dashboard 600 may also include a section 708 that displays a list of issues corresponding to the potential incident along with the description and other property values of each issue.

In one embodiment, the assistant program 109 may retrieve the list of issues and create the summary of properties from the issue descriptors, which were received at step 502 and identified to be the issues created in the interval corresponding to the alert. In this case, the issue data may not be accurate (e.g., if the status of the issues has changed). In other embodiments, the assistant program 109 may identify the identifiers of the issues that were related to the alert (e.g., from the issue descriptors analyzed at step 504) and may query the ITS system or the intermediary system to provide the latest status for that list of issue identifiers.

Finally, the user interface 700 may include two selectable affordances—'False alarm' 710 and 'Next' 712. The user may select the false alarm option 710 if the user determines that the potential incident is not a real or actual incident—e.g., after reviewing the summary section and the list of issues section of user interface 700. Alternatively, the user may select the 'Next' option 712 if the user determines that the potential incident is a real or actual incident.

At step 606, a determination is made whether the potential incident is a real or actual incident or not. In one embodiment, this determination is made based on a user selection of the 'False alarm' interactive affordance or the 'Next' interactive affordance and this selection being forwarded by the client to the assistant program 109.

If at step 606 a determination is made that the potential incident was not a real or actual incident, the method proceeds to step 608 where the assistant program 109 may be ended and the management module may forward a false alarm indicator to the incident detection module 107, which in some cases (e.g., where it was paused) may return to performing method 500 until a next potential incident is detected. Further, each time a potential incident is determined to be a false alarm, the incident management system 106 may record the false alarm and the conditions (e.g., the alarm criteria) for detecting the incident. This information may be used as feedback to automatically update the threshold rates. For example, if the incident detection module 107 detects a threshold number of false incidents within a particular period, the incident detection module 107 may be configured to increase its threshold rate for that period of the day. This way, the incident detection module 107 can self-regulate and improve its accuracy over time.

Figure 8:
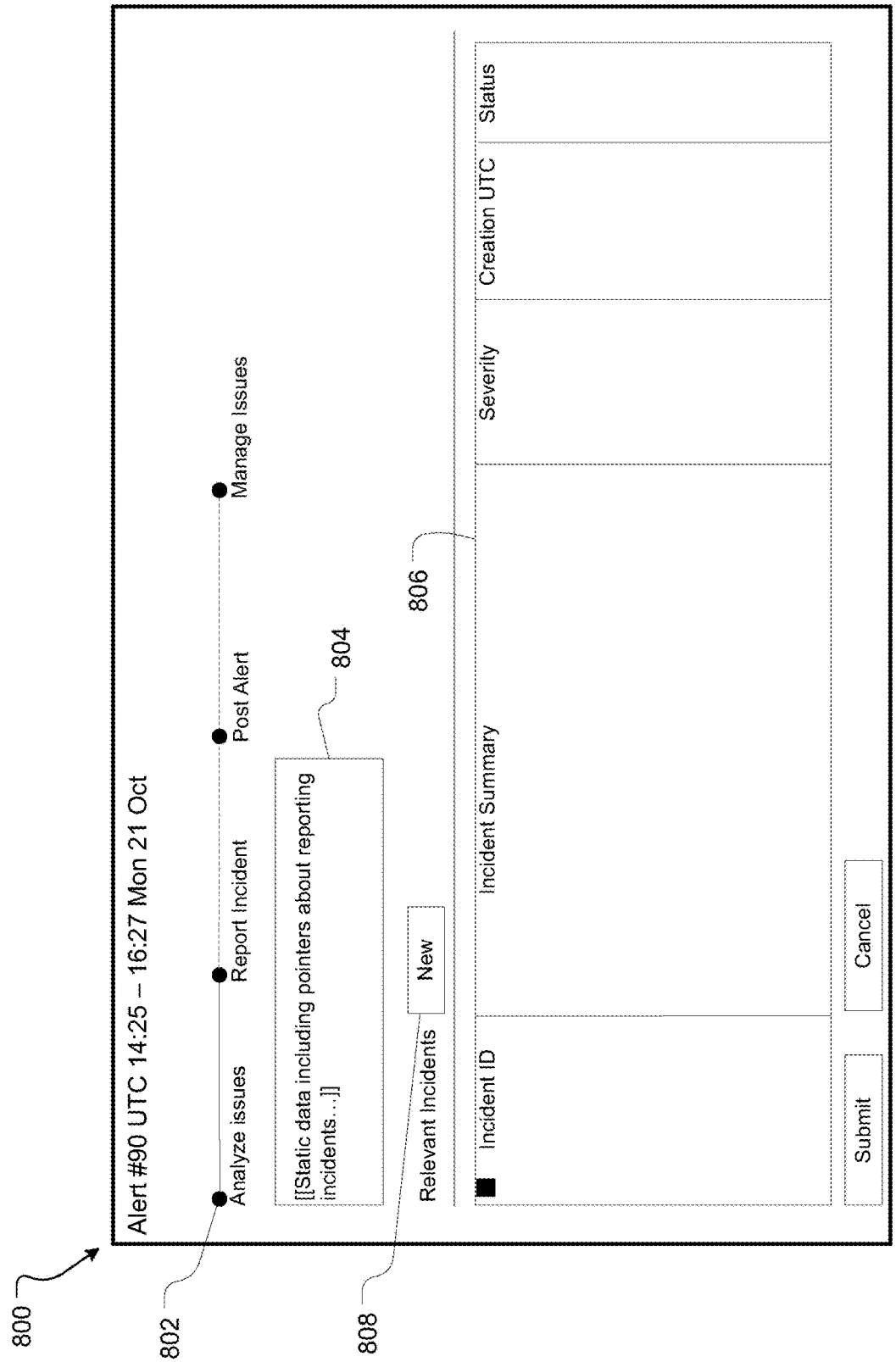
FIG. 8 is a screenshot illustrating a second example user interface of an assistant program according to some aspects of the present disclosure.

Alternatively, if at step 606, a determination is made that the potential incident is a real or actual incident (e.g., because the user selected the 'next' interactive affordance), the method proceeds to step 610 where the assistant program retrieves a list of recently reported incidents. To this end, the assistant program may query the ITS server or the intermediary system to retrieve a list of unresolved incidents reported in a predetermined interval (e.g., last 24 hours). This dynamically (almost real time) retrieved data about unresolved incidents may be packaged along with static data and forwarded to the client to render a next user interface. The client in turn utilizes the data to render the corresponding user interface. FIG. 8 illustrates an example user interface 800 that may be displayed in response to this step.

The user interface 800 includes a graphical representation 802 (similar to the representation 702) showing the order of steps and corresponding user interfaces available in the dashboard 800 with the currently selected user interface being highlighted. In this example dashboard, the 'report HOT incident' user interface affordance is highlighted. In addition, the user interface 800 includes static information about one or more functions the user can perform while the user is on the current user interface of the dashboard. In the illustrated example, this information is depicted in box 804.

The user interface also includes a section 806 displaying the list of unresolved incident tickets along with relevant information about the incidents—e.g., an incident identifier, a description of the incident, a severity of the incident, date and time the incident ticket was created and a current status of the incident. Further still, the user interface may include interactive affordances to allow the user to report the incident as a new incident or link the current incident to an already reported incident.

The user may review the list of incident tickets to determine whether the current incident has already been reported. If the incident has already been reported, the issues related to the current incident can be linked to the reported incident. Alternatively, if the incident is unreported, the user can utilize the assistant program to report the incident.

Accordingly, at step 612, a determination is made whether the incident has already been reported. This determination may be made, e.g., based on the interactive affordance selected by the helpdesk staff. If the "New" interactive affordance 808 is selected, a determination is made that the incident is unreported. Alternatively, if any of the incident tickets from the list 806 is selected, a determination is made that the incident has previously been reported.

If a determination is made that the incident is unreported, the method proceeds to step 614 where the client generates and display a new user interface, which allows the user to enter a description for the ticket and a severity level. In some embodiments, the data entered in the user interface is communicated back to the assistant program 109, which communicates this information to the ITS server 102 along with a request to create a new incident ticket.

Alternatively, if it is determined that the issue associated with the currently identified incident is already handled as an incident, e.g., because the user has selected an incident ticket from the list, the method proceeds to step 616 where the incident is linked to the existing ticket. In particular, the incident management system detects this selection and adds a label of the current incident to the selected incident ticket. This way, whenever that incident ticket is viewed in the future, the viewer would be able to see that the incident is linked to the current incident.

Once an incident ticket is either created or linked, the method proceeds to step 618 where the assistant program 109 proceeds to render the next user interface in the incident management dashboard—to create a status update. Oftentimes, ITS systems may utilize communication tools to inform customers of the status of their applications and/or services—e.g., to inform customers whether the applications/services are operational and/or if any offered functionality is currently unavailable. Product platforms can also provide updates to inform customers when a particular unavailable functionality is expected to be available. One such communication tool is Statuspage® offered by Atlassian. Statuspage helps organizations inform customers about outages and scheduled maintenance. Customers can subscribe to updates via email or text messages when an incident is reported on the organization's webpage, and updates can also be embedded directly into other interfaces and web properties.

Figure 9:
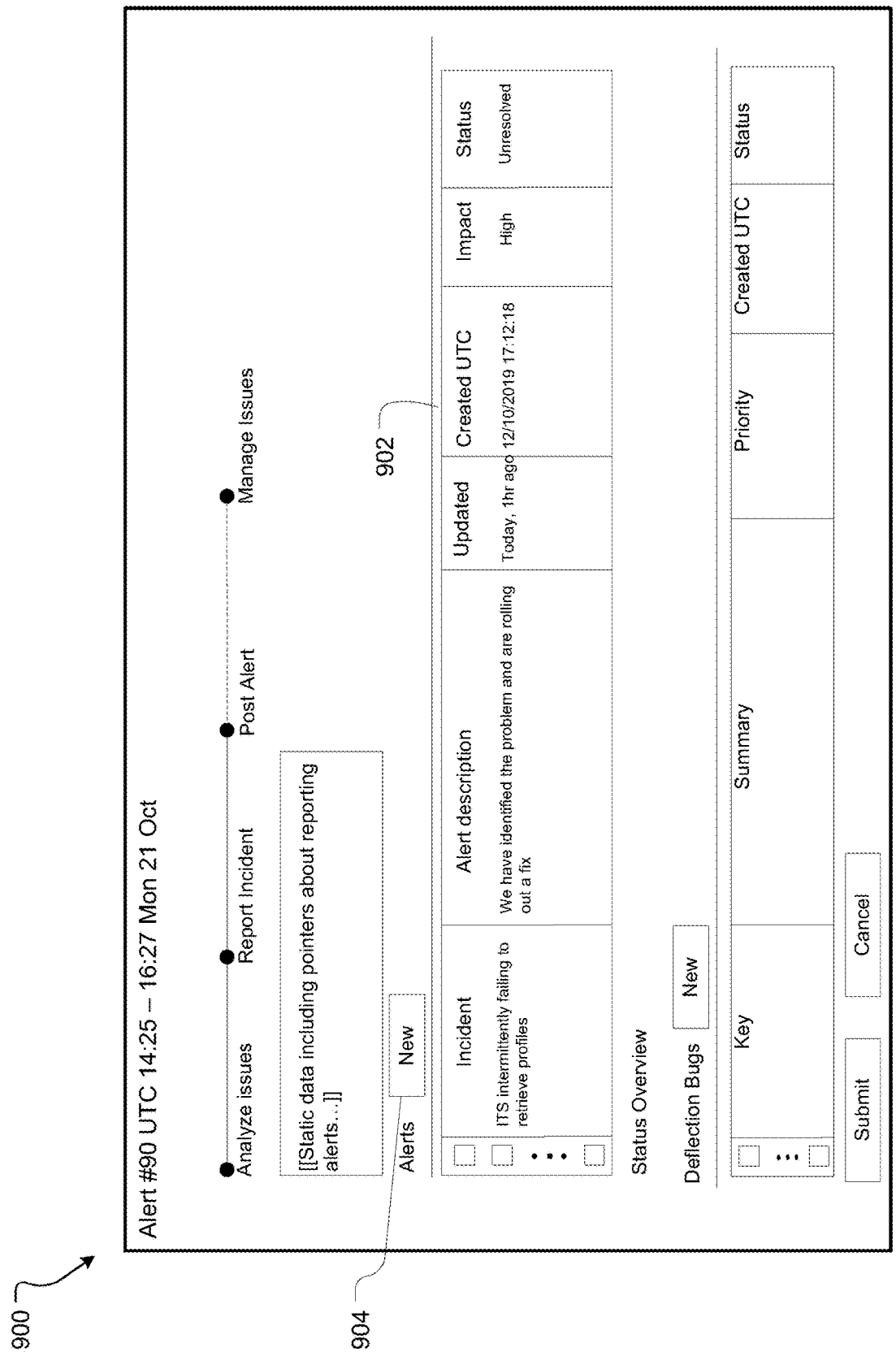
FIG. 9 is a screenshot illustrating a third example user interface of an assistant program according to some aspects of the present disclosure.

FIG. 9 illustrates an example user interface 900 rendered on a user device to automatically retrieve a description for communicating to the communication tool (e.g., to create a status update). The user interface 900 includes a list of existing status updates 902 and a selectable affordance 904 to create a new status update. To display this list of existing status updates, the assistant program 109 communicates with the communication tool (e.g., via its API) when user interface 900 is activated to retrieve a list of all status updates created for the affected service/product in the time period between when the alert was first created and the current time.

Next, at step 620, a determination is made if an alert status already exists. This determination can be made based on a user selection on user interface 900. If the list of active status updates does not include any status updates relating to the currently identified incident, the user may select the selectable affordance to create a new status update. Selection of the selectable affordance results in the assistant program 109 forwarding instructions to the client to render a new pop-up user interface. This user interface (not shown), may provide one or more templates for creating the status update message. Once the status update message is created, the status update message may be communicated directly to the communication tool to post on the organization's webpage at step 622.

Alternatively, if it is determined that an alert status already exists, e.g., based on the user selecting one of the displayed status updates, the assistant program may link the current incident to the selected alert status and the method directly proceeds to step 624.

In addition to displaying a list of active status updates and an affordance for creating a new status update, the user interface 900 further includes a list of active deflection bugs associated with the application/program associated with the incident and a selectable affordance to create a new deflection bug. Deflection bugs are essentially records of bugs maintained in a public bug tracking tool (such as JAC) to communicate outages and critical bugs to customers. Deflection bugs may be used when an incident may not affect all customers, but still needs a fix.

If the user determines that the number of users affected by the incident is below a threshold, at this stage, instead of reviewing the list of status alert and determining whether to create a new status alert or not, the user may review the list of deflection bugs and determine whether to create a new deflection bug or not.

Once a status update or deflection bug is created/selected, the method 600 proceeds to step 624 where the assistant program 109 generates and forward data for the next user interface to be rendered by the client. This next user interface allows the user to manage issues associated with the current incident. In addition to the usual static information (e.g., sequence of steps and informational instructions), this user interface may display a list of tickets associated with the incident—i.e., the tickets that were created when the potential incident was detected and tickets that were created after the potential incident was detected. Similar to process at step 604, the assistant program 109 may retrieve this list of tickets from the ITS server 102 or an intermediary system on the fly, i.e., immediately before causing the fourth user interface to be rendered by the client. In this manner, the assistant program 109 displays a list of the most current tickets for the user to action.

The developer may review these issues and label one or more of the issues as being associated with the current incident and/or decide to respond to one or more of these issues with a common comment—e.g., a message informing the ticket creators that the support staff is reviewing the issue and providing a link to the status update page.

Figure 10:
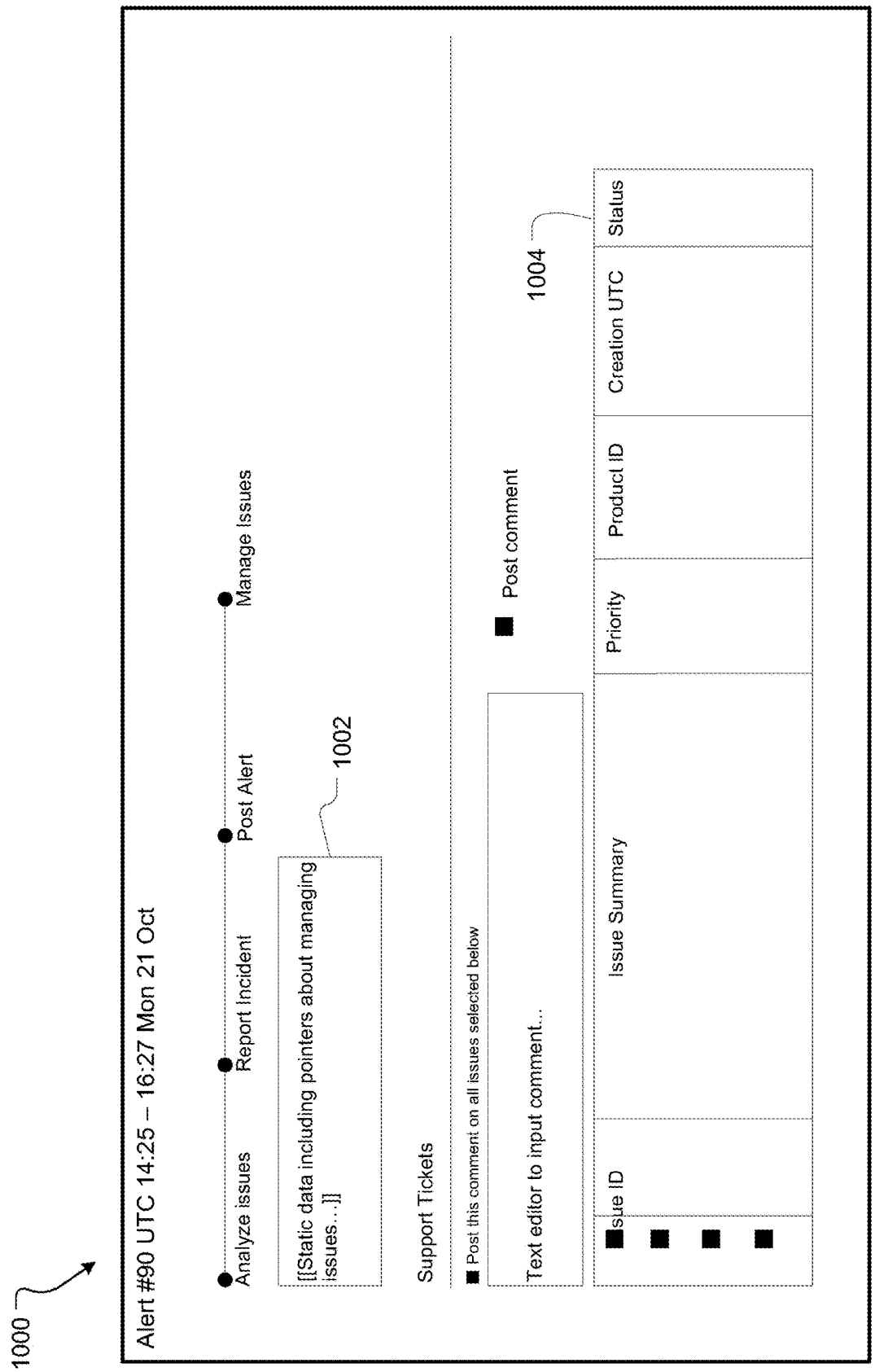
FIG. 10 is a screenshot illustrating a fourth example user interface of an assistant program according to some aspects of the present disclosure.

FIG. 10 illustrates an example user interface 1000 for managing issues. In addition to a list of issues 1004, this user interface 1000 include an editor interface 1002 to create a comment and selectable affordances against each of the issues in the list 1004.

At step 626, the assistant program 109 determines whether any issues need to be updated. This determination is made based on the user selecting one or more issues from the list 1004 (e.g., by selecting a selectable affordance against that issue). Upon making this determination, the assistant program makes an API call to the selected issue to link the selected issue to the current incident (e.g., by adding a label for the incident to the selected issue). If the user has also created a comment in the edit editor interface 1002 and selected the comment, the assistant program also posts the created comment against the issue, once again through the API. In the case of Jira, the command used to do this is a Jira REST API update command, and it contains the issue details, the label to be added (typically HOT-XXXXX) and the comment to be added (optional).

Alternatively, if it is determined that no issues need to be updated, e.g., because the user has not selected any issues in the list 1004, the method 600 ends.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A method for operating an incident detection system, the method comprising:
    receiving a first issue report at an issue tracking system at a first time;
    receiving a second issue report at the issue tracking system at a second time after the first time;
    determining an interval between the first time and the second time;
    selecting a field populated in both the first issue report and the second issue report;
    extracting a first data item from the populated field of the first issue report;
    extracting a second data item from the populated field of the second issue report;
    determining a similarity between the first data item and the second data item;
    in accordance with a determination that the interval is less than the threshold time interval and that the similarity exceeds a threshold similarity value, creating or incrementing a similar issue report count;
    creating or updating a similar issue report rate based at least in part on the similar issue report count;
    determining that the similar issue report rate exceeds a threshold rate, causing the incident detection system to provide an output indicating that a possible incident has been identified.

2. The method of claim 1, wherein:
    the output comprises updating a user interface of the issue tracking system to notify a user of the user interface that the possible incident has been identified; and
    updating the user interface comprises generating a notification and rendering the notification within the user interface.

3. The method of claim 1, wherein the output comprises updating a user interface of a helpdesk system to notify a user of the helpdesk system that the possible incident has been identified.

4. The method of claim 1, wherein the output comprises a notification.

5. The method of claim 1, wherein the populated field comprises an issue report title.

6. The method of claim 1, wherein the populated field comprises an issue report description.

7. The method of claim 1, wherein the output comprises a notification includes a link to open a helpdesk application.

8. The method of claim 1, wherein the first data item and the second data item comprise a listing of keywords extracted from the populated field.

9. The method of claim 1, wherein the populated field comprises one of:
    a location of a reporting user;
    a time of day;
    a software used by the reporting user; or
    a service referenced by the reporting user.

10. A method for operating an incident detection system, the method comprising:
    receiving a series of issue reports within a threshold time period at an issue tracking system;
    comparing content extracted from a common field of each received issue report to group each received issue among a set of similar issues;
    creating or updating a similar issue report rate for each group;
    creating or updating a priority designation for each group; and
    determining that at least one similar issue report rate exceeds a threshold rate or that at least one priority designation exceeds a threshold priority, causing the incident detection system to provide an output indicating that a possible incident has been identified.

11. The method of claim 10, wherein the common field comprises:
    a location of a reporting user;
    a time of day;
    a software used by the reporting user; or
    a service referenced by the reporting user.

12. The method of claim 10, wherein the content comprises:
an issue report title; or
an issue report description.

13. The method of claim 10, wherein the output comprises updating a user interface of the issue tracking system to notify a user of the issue tracking system that the possible incident has been identified.

14. The method of claim 10, wherein the output comprises updating a user interface of a helpdesk system to notify a user of the helpdesk system that the possible incident has been identified.

15. The method of claim 10, wherein the output comprises a notification.

16. The method of claim 15, wherein the notification includes a link to open a helpdesk application.

17. An incident detection system comprising:
a memory; and
a processor coupled to the memory and configured to execute an executable instruction stored in the memory to:
  determine an interval between a first time at which a first issue report is received at an issue tracking system and a second time at which a second issue report is received at the issue tracking system;
  select a field populated in both the first issue report and the second issue report;
  extract a first data item from the populated field of the first issue report;
  extract a second data item from the populated field of the second issue report;
  determine a similarity between the first data item and the second data item;
  in accordance with a determination that the interval is less than a threshold time interval and that the similarity exceeds a threshold similarity value, create or increment a similar issue report count;
  create or update a similar issue report rate based at least in part on the similar issue report count;
  in accordance with a determination that the similar issue report rate exceeds a threshold rate, causing the incident detection system to provide an output indicating that a possible incident has been identified.

18. The incident detection system of claim 17, comprising a graphical user interface comprising the output.

19. The incident detection system of claim 17, wherein the populated field comprises:
an issue report title;
an issue reporter location;
an issue description; or
an issue type.

20. The incident detection system of claim 17, wherein the output comprises a notification.

* * * * *